United States Patent [19]

Price

[11] Patent Number: 4,889,740
[45] Date of Patent: Dec. 26, 1989

[54] POURABLE SHORTENING AND PROCESS FOR ITS PREPARATION

[75] Inventor: Judith E. Price, Yorba Linda, Calif.

[73] Assignee: Beatrice/Hunt-Wesson, Inc., Fullerton, Calif.

[21] Appl. No.: 53,403

[22] Filed: May 22, 1987

[51] Int. Cl.$^4$ .............................................. A23D 5/00
[52] U.S. Cl. ...................................... 426/606; 426/417
[58] Field of Search ......................... 426/606, 417, 607

[56] References Cited

U.S. PATENT DOCUMENTS

| | | | |
|---|---|---|---|
| 1,389,947 | 9/1921 | Hechler | 426/606 |
| 2,521,219 | 9/1950 | Holman et al. | 426/606 |
| 2,521,242 | 9/1950 | Mitchell, Jr. | 426/606 |
| 2,815,285 | 12/1957 | Holman et al. | 426/606 |
| 2,846,312 | 8/1958 | Lantz et al. | 426/606 |
| 2,868,652 | 1/1959 | Brock | 426/606 |
| 2,999,022 | 9/1961 | Payne et al. | 426/606 |
| 3,047,402 | 7/1962 | Schmidt | 426/606 |
| 3,395,023 | 8/1968 | Haighton et al. | 426/606 |
| 3,455,699 | 7/1968 | Bell et al. | 426/606 |
| 3,623,888 | 11/1971 | Reid | 426/606 |
| 3,637,402 | 1/1972 | Reid | 426/606 |
| 3,857,985 | 12/1974 | Reid et al. | 426/606 |
| 4,359,482 | 11/1982 | Crosby | 426/606 |
| 4,469,710 | 9/1984 | Reilley et al. | 426/541 |

FOREIGN PATENT DOCUMENTS 1050680 12/1966 United Kingdom .
1207510 10/1967 United Kingdom .

Primary Examiner—Donald E. Czaja
Assistant Examiner—Celine T. Callahan
Attorney, Agent, or Firm—Pretty, Schroeder, Brueggemann & Clark

[57] ABSTRACT

A process for preparing a stable pourable shortening having a pumpable consistency that is retained at ambient temperatures after storage for extended periods over a temperature range of about 0° F. to about 100° F. and the resulting product. Solid fatty glyceride particles capable of crystallizing in the beta phase are mixed with liquid glyceride oil. The particle size of the solid particles is reduced while dispersed in the liquid oil until substantially all of the particles have a maximum particle size of about 70 microns. The temperature of the mixture is increased as the particle sizes of the solid particles are reduced such that the temperature does not exceed the melting point of the solid fatty glyceride particles and at least 10% of the solid fatty glyceride particles remain in the solid phase. The mixture is cooled to ambient temperature to form a pourable shortening having from about 2 to about 18% by weight total solid particles with at least 90% of the particles having a particle size less than about 45 microns and at least about 80% of the particles having a particle size less than about 30 microns. The pourable shortening can be used for frying and pastry baking, and incorporation of an emulsifier provides an all-purpose pourable shortening that is particularly adapted for baking cakes.

36 Claims, 1 Drawing Sheet

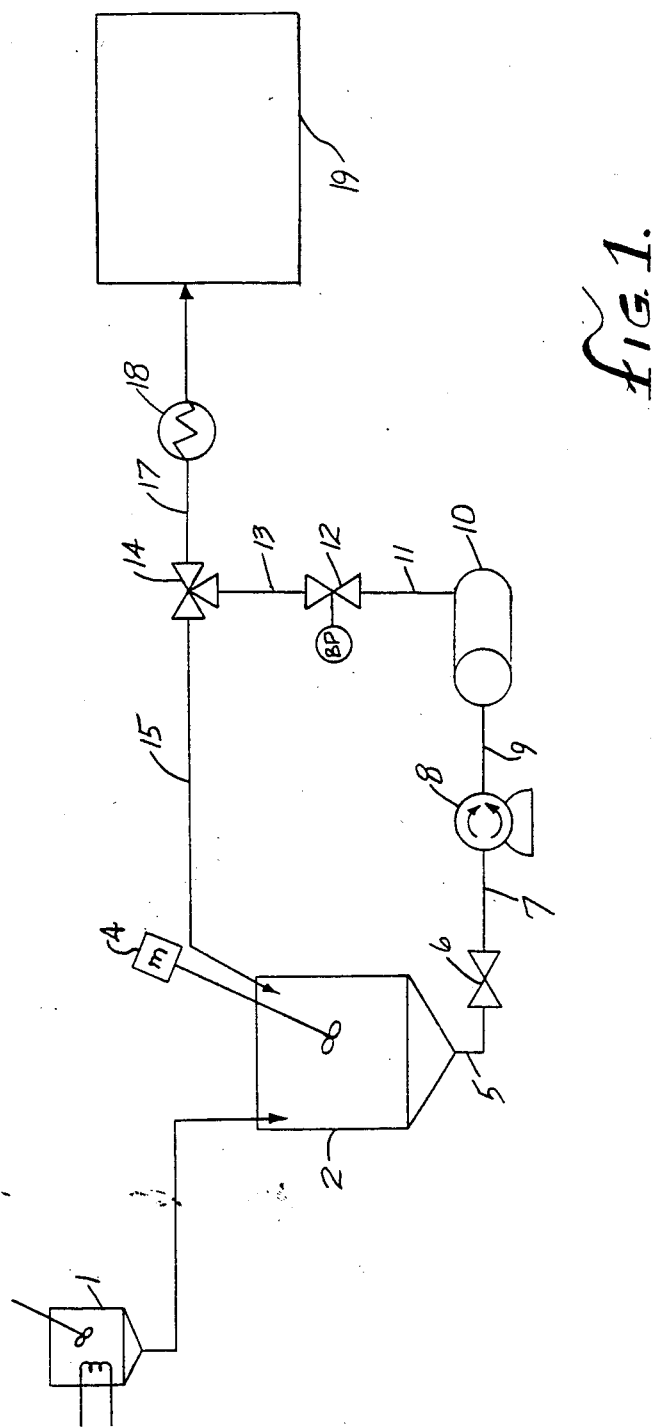

POURABLE SHORTENING AND PROCESS FOR ITS PREPARATION

BACKGROUND OF THE INVENTION

This invention relates to a pourable shortening having excellent frying and baking characteristics that, with the addition of emulsifiers, is useful as an all-purpose shortening. More particularly, the present invention relates to an improved process for making a stable pourable shortening without first melting and recrystallizing substantially all of the solid fatty glyceride particles and to the resulting product. The pourable shortening of the present invention has a pumpable consistency that is retained at ambient temperature after storage for extended periods over a temperature range of about 0° F. to about 100° F.

Plastic shortenings are typically used for a variety of baking and frying applications. Such shortenings are non-fluid and are generally prepared from liquid glyceride oils by incorporating therein or forming in situ desired amounts of triglycerides that are normally solid at room temperatures. Typically, the liquid glyceride oils are blended with molten triglycerides which, after the application of suitable cooling procedures, form a non-fluid plastic mass.

However, shortening compositions that have a fluid consistency so that they can be easily pumped, readily dispersed, measured by volume rather than by weight, and more readily mixed with the other constituents for baking without undue labor are increasingly preferred. These fluid shortenings typically comprise suspensions of the normally solid triglycerides in the normally liquid glyceride portion.

One requirement for a marketable pourable shortening is that the solid particles be evenly distributed throughout the liquid phase and remain so for extended periods of time over an extended temperature range without settling out. However, a recurring problem with known pourable shortenings is the tendency of the solid component to separate from the liquid component over a relatively short period of time, particularly when the shortening is subjected to temperature extremes, e.g., below freezing (32° F.) or above normal room temperatures (e.g., above 72°–78° F.). Another recurring problem is the tendency of known pourable shortenings to become significantly more viscous after exposure to temperatures above normal room temperature, for example 90°–95° F., and, as a result, to lose their fluidity.

The solid triglycerides typically used in shortenings are known to exhibit polymorphic crystal behavior, i.e., they can exist in various distinct crystalline forms known as, e.q., alpha, beta, and beta-prime. In plastic, non-pourable shortenings, beta-prime crystals are preferred because they tend to be short needle-like crystals that create a fine network of interlacing, but discrete, crystals in which liquid oil is enmeshed. Beta crystals, however, are typically much larger with less tendency to form cohesive forces among crystals, and do not form an interlacing network. As a result, beta crystals are preferred in a pourable shortening to preserve its fluidity.

The specific crystal form obtained for a solid triglyceride is generally dependant upon the composition of the fat and the temperature and speed at which crystallization takes place. For example, the least stable crystalline forms, generally the alpha and beta-prime forms, tend to form upon rapid chilling of the molten fat component. Transformation of the alpha and beta-prime crystals to the more thermodynamically stable beta form generally occurs over an extended period of time. Most present methods for making pourable shortenings melt all of the solid triglyceride particles by heating them above their melting point and then recrystallizing portions of the triglycerides using votation followed by recycling back into the melted feedstock to cool the entire mass, or by slow, agitated chilling of the entire mass. Both types of methods will yield beta crystals. Still other known pourable shortenings thermally treat the solid triglycerides prior to addition to the liquid oil to insure that the solids exist in the beta phase. These known processes are time-consuming, require additional expenditures of energy resources, are expensive, and require the careful recrystallization of the solid fat particles to insure that they are in the beta phase.

Accordingly, it is an object of this invention to provide a pourable shortening that is convenient to use.

It is another object of this invention to provide a pourable shortening that can be used for frying and pastry baking.

It is a further object of this invention to provide an all-purpose pourable shortening.

It is yet another object of this invention to provide a pourable shortening without melting and recrystallizing all of the solid triglyceride particles.

Another object of this invention is to provide a pourable shortening that is pumpable at ambient temperature after storage over a temperature range from about 0° F. to about 100° F.

SUMMARY OF THE INVENTION

In accordance with the present invention, an opaque, preferably creamy white, temperature stable, smooth textured, pourable shortening is obtained by mixing solid fatty glyceride particles in a liquid glyceride oil and reducing the size of the solid particles as the temperature of the mixture increases without melting substantially all of the solid particles. Preferably, the solid fatty glyceride particles are dispersed in the liquid glyceride oil by wet grinding in a colloid mill or equivalent dispersing equipment. Wet grinding causes a shearing action that reduces the particle size of the solid fatty glyceride particles. At the same time, the temperature of the mixture is increased which causes crystal modification of the solid fatty glyceride particles to the beta crystal phase or solubilization of at least some of the fatty glyceride particles, or both. Consequently, the process of the present invention yields beta crystals much smaller than those found in pourable shortenings made by presently known processes. The combination of the finely divided size of the solid fatty glyceride particles achieved by the wet grinding together with their crystal modification to the beta phase, or with their solubilization and recrystallization in the beta phase, or both, due to the increase in the temperature of the mixture while wet grinding yields a unique crystal structure that is resistant to settling, separation or loss of fluidity after storage over a wide temperature range.

Preferably, for best fluidity and stability, at least 80% of the solid fatty glyceride particles in the pourable shortening are in the beta crystal phase. The solid fatty glyceride particles have a particle size after wet milling ranging from less than about one micron to about 70 microns with preferably at least 90% of the particles less than about 45 microns and 80% less than about 30 microns. It is particularly preferred that all of the solid fatty glyceride particles have a particle size less than about 30 microns with at least 80% of the particles having a particle size less than about 15 microns and 70% less than about 10 microns. Pourable shortenings made in accordance with the process of the present invention preferably have a pleasing white appearance with a viscosity from about 200 cps to about 25,000 cps and are pumpable at ambient temperature after storage over the temperature range of about 0° F. to about 100° F. without undergoing separation or permanent loss of fluidity. "Ambient temperature" as used herein means room temperature, or from about 65° F. to about 80° F.

The solid fatty glyceride particles and any other solid additives, such as emulsifiers, surfactants, or crystal modifying or inhibiting compounds, are preferably in the form of a powder, beads or flakes prior to dispersing in the liquid glyceride oil. Any liquid or gel-like additives are preferably heated in a separate portion of the liquid glyceride oil to a temperature sufficiently high to solubilize them in the oil. This solution is then added to the remainder of the liquid glyceride oil to which is added the solid fatty glycerides and any solid additives. The entire mixture is preferably continuously agitated and recirculated through a colloid mill or equivalent size reduction equipment and back to the feedstock such that mill friction, or the addition of external heat, or both, increases the temperature of the mixture. The temperature of the mixture is controlled such that it does not exceed the melting point of the solid fatty glyceride particles and at least about 10% of the fatty glyceride particles remain in the solid phase. Preferably, at least about 30% of the fatty glyceride particles remain in the solid phase, and most preferably between about 35 to about 40%. The mixture is then cooled to ambient temperature to form a pourable shortening having from about 2 to about 18% by weight total solid particles.

While the pourable shortening of the present invention without the addition of emulsifiers has excellent frying and pastry baking characteristics, incorporation of selected emulsifiers provides an all-purpose pourable shortening particularly adapted for baking cakes. Other additives may be included to provide improved frying performance in terms of spattering and sticking.

BRIEF DESCRIPTIONS OF THE DRAWING

FIG. 1 is a schematic view of apparatus suitable for practicing the process of the present invention.

DETAILED DESCRIPTION OF THE INVENTION

As shown in FIG. 1, a liquid glyceride oil is placed in a suitably large container 2. Solid fatty glyceride particles, and any solid additives, such as a desired emulsifier or crystal modifying or inhibiting compound, all of which are preferably in the form of a powder, beads or flakes, are then blended therein using a suitable mixer 4 such as, e.g., a "lightnin" mixer, to agitate the mixture. Any semi-solid or liquid additives are preferably first heated to a temperature sufficiently high to solubilize them in a separate portion of the liquid glyceride oil in a separate container 1 and then combined with the liquid glyceride oil in container 2 prior to the addition of the solid ingredients.

As the solid fatty glyceride particles, together with any solid additives, are gradually added to the liquid glyceride oil, the mixture is preferably continuously agitated and recirculated via lines 5, 7, 9, 11, 13 and 15 by means of pump 8 through two-way valve 6 and into a colloid mill 10 or equivalent size reduction apparatus such as, for example, a bead, ball or pebble mill, or their equivalents, where the solid particles are milled by wet grinding to reduce their particle size. Of course, the smaller the initial particle size of the solid ingredients, the less reduction in particle size is required by wet grinding. Back pressure valve 12 aids in regulating the flow rate of the mixture. Flow rate can vary depending upon the size of the system, but it is generally limited by the flow through the gap in the colloidal mill 10. After passing through colloid mill 10 and the back pressure valve 12, the mixture may be returned to container 2 or, when the desired particle size and the temperature of the mixture that achieves the desired percentage of fatty glyceride particles in the solid phase are reached, diverted via the three-way valve 14 to a storage or filling facility 19 where the resulting pourable shortening can be stored or filled into bottles, cans, or similar containers. Cooling of the pourable shortening using heat exchanger 18 prior to storage or filling is optional. The mixture may also be degassed in a deaerator (not shown) prior to storage or filling as is well known in the art.

Wet grinding is the size reduction of solid particles that are mixed with a liquid. Slurries or crude mixtures to be ground are forced into a space, or gap, between grinding elements where the particles are subjected to large forces of hydraulic shear or mechanical abrasion, or both, and are broken or torn apart by frictional drag. In general, wet grinding is typically more efficient than dry grinding for producing very small particles. The apparatus used in the process of the present invention is preferably capable of producing particles having particle sizes less than about 10 microns. Preferably, the mill's gap setting can be adjusted to 0.003 inch or smaller. An example of a preferred wet grinding mill for the process of the present invention is the Chemicolloid Charlotte Mill.

In the process of the present invention, the wet grinding must be accompanied by an increase in the temperature of the mixture. This is accomplished either by the heat of friction created by the mill during wet grinding or by adding external heat, or both. Suitable applications of external heat may be accomplished by the use of a mill jacket, or the addition of a heat exchanger, either prior to entering the mill (not shown) that is set to achieve a mill exit temperature in the desired range, or immediately after the mill (not shown) which is similarly set to achieve a temperature in the range that will provide the desired percentage of solid fatty glyceride particles in the solid phase. The wet grinding in combination with the increase in temperature serves to reduce the particle size of the solid fatty glyceride particles, causes at least some of the solid particles to melt, either totally or partially, and preferably initiates crystal modification of the solid fatty glyceride particles to the beta crystal phase. Preferably, to provide the desired stability and consistency of the pourable shortening, the increase in temperature of the mixture is controlled so that the temperature does not exceed the melting point of the solid fatty glyceride particles and at least about 10% of the fatty glyceride particles remain in the solid phase. More preferably, at least about 30% of the solid fatty glycerides remain in the solid phase with from about 35% to about 40% particularly preferred. The temperature at which the desired percentage of the solid fatty glyceride particles remain in the solid phase can be measured by Differential Scanning Calorimetry on an unmilled mixture of all ingredients.

Preferably, after wet grinding the particle size of the solid fatty glyceride particles ranges from less than about 1 micron up to about 70 microns, with at least 90% of the particles having a particle size less than about 45 microns and at least 80% having a particle size less than about 30 microns. Most preferably, substantially all of the solid fatty glyceride particles have a particle size less than about 30 microns with at least 80% of such particles having a particle size less than about 15 microns and at least 70% having a particle size less than about 10 microns. To avoid settling or agglomeration of the solid fatty glyceride particles after wet grinding, it is important to avoid further melting and recrystallizing of the solid fatty glyceride particles which is known to cause large or interlacing crystals to form which will impair the fluidity of the pourable shortening of the present invention. A grainy appearance also results from such large crystal clusters.

While the combined effect of the wet grinding and the increase in temperature on the solid fatty glyceride particles is not fully understood, it is believed that the melting of the solid fatty glycerides occurs primarily at the crystal surface which causes solubilization of some of the solid fatty glycerides in the liquid glyceride oil as well as some modification of the crystal form of other solid fatty glyceride particles. Significantly, the tremendous friction imposed on the individual solid particles by wet grinding achieves temperatures at the crystal surfaces that can be substantially higher than the mass temperature of the mixture during wet grinding.

The finely divided solid fatty glyceride particles resulting from the shearing action of the wet grinding typically yields beta crystals much smaller than those found in pourable shortenings made by other known methods. Viewed under a microscope, the crystals are composed of individual, short, needle-like crystals rather than the crystal clusters of "cockleburr-type" or very long needle-like crystals. These finely divided particles create a stable pourable shortening having an attractive white appearance in which the solid fatty glyceride particles remain suspended in the liquid glyceride oil despite temperature fluctuations from about 0° F. to about 100° F. The resulting pourable shortening has a total solids content ranging from about 2 to about 18% by weight and a viscosity ranging from about 200 cps to about 25,000 cps. The viscosity can be varied by changing the amount per unit volume of the solid fatty glyceride particles or by changing the processing temperature, provided that the temperature is never high enough to melt substantially all of the solid fatty glyceride particles. The solid fatty glyceride particles employed in the pourable shortening of the present invention must have a stable beta crystal phase at ambient conditions and be capable of conversion to the beta phase from an alpha or beta-prime crystalline phase. Moreover, the melting point of the solid fatty glyceride particles is preferably above 100° F. and more preferably above 120° C., since the pourable shortening can be expected to experience temperatures of up to 100° F. under normal storage conditions. Thus, the use of solid fatty glyceride particles that melt at a temperature between 60° F. and 100° F. causes an undesirable separation of the liquid and solid phases at higher temperatures because such solid particles have a tendency to resolidify in very large clusters which will settle out after a short time. The solid fatty glyceride particles used in the present invention are preferably formed from triglycerides having strong beta-forming crystal tendencies, such as, for example, tristearin, tripalmitin, symmetrical palmito distearin, or mixtures thereof. Suitable examples of such solid fatty glycerides include, but are not limited to, substantially completely saturated triglyceride fats made by hydrogenation of vegetable or animal oils, such as soybean oil, safflower oil, sunflower seed oil, corn oil, linseed oil, hazelnut oil, olive oil, low erucic acid rapeseed oil, peanut oil, sesame oil, palm kernel oil, lard, cocoa butter, or mixtures of any of these oils. Hydrogenated triglyceride fats are preferably deodorized after hydrogenation and then converted into a flake, bead or powder using a process such as spray chilling, cryogrinding, or chill roll flaking. Soybean, corn, low erucic acid rapeseed, peanut and sunflower seed oils are particularly preferred since these oils are marketed nationally and have already been approved for use in shortenings by the Food and Drug Administration.

In addition to the solid fatty glyceride materials specified above, beta-prime tending hydrogenated oils and fats may be utilized in the pourable shortening of the present invention, provided that the beta-prime tending oils and fats are capable of being thermally pre-treated to convert them to the beta phase.

Liquid glyceride oils useful in the present invention may be derived from unhydrogenated or hydrogenated and winterized vegetable oils, such as soy, corn, sunflower, safflower, peanut, low erucic acid rapeseed, palm, cottonseed oils, or any mixtures or combinations of these oils. Preferably, the Iodine Value of the liquid glyceride oil ranges from about 90 to about 130. Certain liquid oil fractions obtained from palm oil, lard, or tallow by graining or directed interesterification may also be utilized, as can marine oils. Soybean, corn, cottonseed, low erucic acid rapeseed, and sunflower seed oils are particularly preferred because these oils are marketed nationally and have already been approved for use in shortenings by the Food and Drug Administration. The liquid glyceride oils should contain at best a minimum of glycerides having melting points within the range of normal storage temperatures, i.e., 60° to 100° F., because the resolidification which occurs on cooling to ambient temperature creates large crystals which have a tendency to settle. The liquid glyceride oil generally comprises from about 82 to about 98% by weight pourable shortening.

To improve the ability of the pourable shortening of the present invention to produce baked goods, such as cakes, with excellent grain and texture, emulsifiers may be used in the pourable shortening of the present invention. Such emulsifiers may include, but are not limited to, distilled monoglycerides, mono and di-glycerides, lactylated monoglycerides, acetylated monoglycerides, propylene glycol mono and di-esters, sorbitan esters, or polyglycerol esters. For best fluidity and stability in the pourable shortening, it is preferred that such emulsifiers are either a liquid or gel at room temperature or a solid having a melting point above 100° F., preferably above 120° F. Liquid or gel-like emulsifiers are preferably added to a separate portion of the liquid glyceride oil, and heated to a temperature sufficient to solubilize them in the oil, e.g., about 150° F. This solution is then combined with the remainder of the liquid glyceride oil, preferably prior to the addition of the solid ingredients.

Solid emulsifiers are preferably in the form of a powder, bead, or flake, and are added at the same time that the solid fatty glyceride particles are combined with the liquid glyceride oil. If emulsifiers are used, they preferably comprise from 0 to about 10% of the pourable shortening. Significantly, if an emulsifier which is a solid at temperatures above 100° F. is used, the amount used must be considered part of the total solids content because it will contribute to the appearance and viscosity of the finished product in a manner similar to the solid fatty glyceride particles. Therefore, the total amount of solid fatty glyceride particles, as well as any other solid additives, must be reduced accordingly so that the total solids content of the pourable shortening of the present invention does not exceed about 18%.

To improve the stability of the pourable shortening of the present invention to separation, additives such as surfactants and crystal modifying or inhibiting compounds may be used. Suitable examples include, but are not limited to, polyglycerol esters, lecithin, or oxystearin. Some of these additives may also benefit the frying or baking performance of the pourable shortening by reducing spattering or sticking or improving emulsification. Such additives may comprise from about 0.01 to about 1.0% by weight of the product and, if solid, the effect on the total solids content must be taken into account as pointed out above.

As noted above, the pourable shortening of the present invention preferably has a creamy white appearance, particularly if light-colored basestocks are used. It is believed that this white, creamy appearance is attributable to the finely divided crystals resulting from the process of the present invention. It is known that fine grinding of crystalline particles, such as paint pigments, provides a greater number of particles and a larger total crystalline surface area to reflect and scatter light, resulting in more opacity. The creamy white appearance of the pourable shortening of the present invention is noticeably whiter and more opaque than pourable shortenings prepared by other known methods from the same basestocks. Measured on the Whiteness Index Scale using a Hunter Lab Model D25, the pourable shortening of the present invention typically exceeds 25 units and may exceed 30 units if light-colored basestocks are used. In any event, the pourable shortening of the present invention is significantly whiter in appearance than pourable shortenings made from the same basestocks by known processes with a color difference of at least 10 units on the Whiteness Index Scale.

The pourable shortening made in accordance with the present invention can undergo temperature fluctuations from about 0° F. to about 100° F. without separation or agglomeration or permanent loss of fluidity. Refrigeration or freezing causes only a temporary loss of fluidity. In such instances, the pourable shortening of the present invention remains pumpable at ambient temperature after such temperature fluctuations. Significantly, the pourable shortening of the present invention need not be stirred or shaken prior to each use.

Addition of carefully-selected emulsifiers within the above-specified amounts provides an all-purpose pourable shortening having cake and pastry performance equal or superior to that of conventional plastic shortenings. Moreover, while the pourable shortening of the present invention has excellent frying and pastry making characteristics without the addition of any additives, outstanding frying performance in terms of reduced spattering or sticking can be achieved by use of the additives discussed above.

The examples that follow provide a more detailed description of the present invention. These examples are, however, merely illustrative and are not intended as a limitation of the scope of the invention.

EXAMPLE I

Solid flakes of soybean oil hydrogenated to an Iodine Value of 5 were cryoground to 25 mesh in a Fitzpatrick hammer mill with dry ice. The solid particles were then dispersed in unhydrogenated soybean oil by using a propeller-type mixer. Also dispersed in the unhydrogenated soybean oil were a beaded distilled monoglyceride having an Iodine Value of 29, a powdered lactic acid ester of monoglyceride, and Polysorbate 60. The overall proportions by weight were:

| | |
|---|---|
| Unhydrogenated Soybean Oil | 83.0% |
| Solid Hydrogenated Soybean Oil (5 I.V.) | 10.0% |
| Distilled Monoglyceride (29 I.V.) | 5.0% |
| Lactic Acid Ester of Monoglyceride | 1.0% |
| Polysorbate 60 | 1.0% |

This mixture was then recirculated through a Chemicolloid Charlotte Mill, Model SD2, set at 0.010" gap clearance at a rate of 3 gpm for 30 minutes at a back pressure of 10 psig. Water at ambient temperature was passed through the cooling jacket of the mill throughout the run to maintain the temperature of the mixture below 130° F. At the end of the 30 minute period, the temperature of the mixture was 120° F. The resulting pourable shortening had a creamy white appearance with a viscosity of about 10,000 cps. The particle sizes of the solid hydrogenated soybean oil in the shortening after wet grinding ranged from less than about 1 to about 22 microns, with 90% less than about 15 microns and 80% less than about 8 microns. After two months of ambient storage, there was no evidence of separation. The resulting shortening had excellent cake baking qualities, producing white cakes with desirable volume and texture.

EXAMPLE II

Solid flakes of soybean oil hydrogenated to an Iodine Value of 10 were cryoground to 28 mesh in a Waring blender with dry ice. The solid fat particles were then dispersed in hydrogenated and fractionated soybean oil having an Iodine Value of 106 by using manual stirring. Soybean lecithin was added to a small separate portion of the liquid soybean oil and heated to 140° F. to thoroughly disperse the lecithin. This mixture was then added to the powdered fat and oil mixture. The overall proportions by weight were:

| | |
|---|---|
| Hydrogenated, Fractionated Soybean Oil (106 I.V.) | 93.5% |
| Solid Hydrogenated Soybean Oil (10 I.V.) | 6.0% |
| Lecithin | 0.5% |

The mixture was then recirculated through a Speco Model 2 Colloid Mill at a rate of 0.5 gpm at a gap clearance of 0.003" with no back pressure, for a period of four minutes. At the end of this time period, the temperature of the mixture was 132° F. The resulting pourable shortening was opaque with a creamy white appearance and a viscosity of about 5000 cps. The particle sizes of the solid fat particles in the shortening after wet grinding ranged from less than about 1 to about 30 microns, with 90% less than about 15 microns and 75% less than about 10 microns. After two months of storage at ambient conditions, there was no evidence of separation. This shortening was an excellent frying shortening with good stability and antistick properties.

EXAMPLE III

Corn oil hydrogenated to an Iodine Value of 6 was cryoground to 28 mesh in a Waring blender with dry ice. The solid fat particles were then dispersed using manual stirring in unhydrogenated sunflower oil. The proportions by weight were:

| | |
|---|---|
| Unhydrogenated Sunflower Oil | 94% |
| Solid Hydrogenated Corn Oil (6 I.V.) | 11% |

The mixture was then recirculated through a Chemicolloid Charlotte Mill, Model SD2, set at 0.003" gap clearance at a rate of 1 gpm, for a period of twenty minutes. At the end of this time period, the temperature of the mixture was 128° F. The particle sizes of the solid hydrogenated corn oil in the shortening after wet grinding ranged from less than about 1 to about 18 microns, with 90% less than about 10 microns. The resulting pourable shortening had a creamy white appearance with a viscosity of about 16,000 cps. After repeated cycling between 40° F. and 100° F., there was no sign of separation or loss of fluidity.

While preferred embodiments and applications of this invention have been shown and described, it would be apparent to those skilled in the art that many more modifications are possible without departing from the inventive concept herein described. The invention, therefore, is to be limited only by the lawful scope of the claims which follow.

What is claimed is:

1. A process for preparing a pourable shortening having solid fatty glyceride particles suspended in a liquid glyceride oil without having melted substantially all of the solid fatty glyceride particles, said process comprising the steps of:

mixing solid fatty glyceride particles having a melting point greater than about 100° F. in a liquid glyceride oil having an Iodine Value from about 90 to about 130 to form a first mixture, said solid particles capable of crystallizing in the beta phase;

reducing the particle size of said particles while dispersed in the liquid glyceride oil until substantially all of said particles have a maximum particle size less than or equal to about 70 microns;

increasing the temperature of the first mixture as the particle sizes of said particles are reduced such that said temperature does not exceed the melting point of said particles and at least about 10% of the solid particles remain in the solid phase; and cooling the first mixture to ambient temperature to form a pourable shortening having from about 2 to about 18% by weight total solid particles with at least about 90% of said particles having a particle size less than about 45 microns and at least about 80% of said particles having a particle size less than about 30 microns, said shortening being pumpable at ambient temperature after storage over the temperature range from about 0° F. to about 100° F.

2. A process as in claim 1 wherein substantially all of the solid fatty glyceride particles have a particle size less than about 30 microns after cooling.

3. A process as in claim 1 wherein at least 70% of the solid fatty glyceride particles have a particle size less than about 10 microns after cooling.

4. A process as in claim 3 wherein at least 80% of the solid fatty glyceride particles have a particle size less than about 15 microns after cooling.

5. A process as in claim 1 wherein the temperature of the first mixture is increased by the heat of friction released by wet grinding said particles to reduce their particle size.

6. A process as in claim 1 wherein the temperature of the first mixture is increased by the addition of external heat.

7. A process as in claim 1 further comprising the steps of mixing a liquid or semi-solid emulsifier with a portion of the liquid glyceride oil to form an emulsifier/oil mixture, heating said emulsifier/oil mixture to a temperature sufficient to solubilize said emulsifier and form a solution, and mixing said solution with the remainder of the liquid glyceride oil prior to forming said first mixture.

8. A process as in claim 7 wherein said emulsifier is present in an amount comprising up to about 10% by weight of such shortening.

9. A process as in claim 7 further comprising the step of mixing a crystal modifying or inhibiting compound with said emulsifier and said separate fraction of liquid glyceride oil before said second mixture is heated.

10. A process as in claim 9 wherein said crystal modifying or inhibiting compound comprises from about 0.01 to about 1.0% by weight of said shortening.

11. A process as in claim 1 wherein more than 80% of the solid fatty glyceride particles in said shortening have crystallized in the beta phase after cooling.

12. A process as in claim 1 wherein the pourable shortening has a viscosity from about 200 cps to about 25,000 cps after cooling.

13. A process as in claim 1 wherein the increase in temperature of the first mixture is such that at least about 30% of the solid particles remain in the solid phase.

14. A process as in claim 13 wherein the increase in temperature of the first mixture is such that at least about 35 to about 40% of the solid particles remain in the solid phase.

15. A pourable shortening prepared in accordance with the process of claim 1.

16. A process for preparing a pourable shortening having solid fatty glyceride particles suspended in a liquid glyceride oil without having melted substantially all of the solid fatty glyceride particles, said process comprising the steps of:

mixing solid fatty glyceride particles having a melting point greater than about 100° F. in a liquid glyceride oil having an Iodine Value from about 90 to about 130 to form a first mixture, said solid particles capable of crystallizing in the beta phase;

wet grinding the solid particles while mixed in the liquid glyceride oil until at least 70% of said particles have a particle size less than about 10 microns, at least 80% of said particles have a particle size less than about 15 microns, and substantially all of the particles have a particle size less than about 30 microns;

increasing the temperature of the first mixture as the solid fatty glyceride particles are wet ground such that the temperature of the first mixture does not exceed the melting point of said particles and at least about 30% of said particles remain in the solid phase; and cooling said first mixture to ambient temperature to form a pourable shortening having from about 2 to about 18% by weight total solid particles with at least about 80% of said solid fatty glyceride particles having crystallized in the beta phase, said shortening having a viscosity from about 200 cps to about 25,000 cps and being pumpable at ambient temperature after storage over the temperature range from about 0° F. to about 100° F.

17. A process as in claim 16 further comprising the steps of mixing a liquid or semi-solid emulsifier with a portion of the liquid glyceride oil to form an emulsifier/oil mixture, heating said emulsifier/oil mixture to a temperature sufficient to solubilize said emulsifier and form a solution, and mixing said solution with the remainder of the liquid glyceride oil prior to forming said first mixture.

18. A process as in claim 17 wherein said emulsifier comprises up to about 10% by weight of said shortening.

19. A process as in claim 17 further comprising the step of mixing a crystal modifying compound with said emulsifier and said fraction of liquid glyceride oil before said second mixture is heated.

20. A process as in claim 19 wherein said crystal modifying compound comprises from about 0.1 to about 1.0% by weight.

21. A process as in claim 16 wherein the temperature of the first mixture is increased by the heat of friction released by wet grinding said particles.

22. A process as in claim 16 wherein the temperature of the first mixture is increased by the addition of external heat.

23. A process as in claim 16 wherein at least about 35 to about 40% by weight of the solid fatty glyceride particles remain in the solid phase as the temperature of the first mixture is increased.

24. A process as in claim 16 wherein solid emulsifiers or solid crystal modifying or inhibiting compounds, or mixtures thereof, are mixed with the liquid glyceride oil and the solid fatty glyceride particles.

25. A process as in claim 16 wherein the solid fatty glyceride particles are selected from the group consisting of soybean oil, corn oil, low erucic acid rapeseed oil, peanut oil, and sunflower seed oil.

26. A process as in claim 16 wherein the liquid glyceride oil is selected from the group consisting of soybean oil, corn oil, cottonseed oil, low erucic acid rapeseed oil, and sunflower seed oil.

27. A pourable shortening prepared in accordance with the process of claim 16.

28. A pourable shortening comprising a suspension of solid fatty glyceride particles having a melting point greater than about 100° F. in a liquid glyceride oil having an Iodine Value from about 90 to about 130, said particles having a maximum particle size of less than or equal to about 70 microns with at least 90% of said particles having a particle size less than about 45 microns and at least 80% having a particle size less than about 30 microns, at least 80% of said fatty glyceride particles being in the beta crystal phase, said pourable shortening having a total solids content ranging from about 2 to about 18% by weight, a viscosity from about 200 cps to about 25,000 cps, and being pumpable at ambient temperature after storage over the temperature range from about 0° F. to about 100° F. without undergoing separation or permanent loss of fluidity.

29. A pourable shortening as in claim 28 further comprising up to about 10% by weight of an emulsifier.

30. A pourable shortening as in claim 28 wherein at least 70% of the solid particles have a particle size less than about 10 microns and at least 80% have a particle size less than about 15 microns.

31. A pourable shortening as in claim 28 further comprising from about 0.1 to about 1.0% by weight of a crystal modifying compound.

32. A pourable shortening as in claim 28 wherein said fatty glyceride particles have a melting point greater than about 120° F.

33. A pourable shortening as in claim 28 wherein said beta crystals are individual needle-like crystals.

34. A pourable shortening as in claim 28 wherein said shortening measures at least 25 units on the Whiteness Index Scale.

35. A pourable shortening comprising a suspension of solid fatty glyceride particles having a melting point greater than about 100° F. and a liquid glyceride oil having an Iodine Value from about 90 to about 130, said particles having a maximum particle size of less than or equal to about 70 microns with at least 90% of said particles having a particle size less than about 45 microns and at least 80% having a particle size less than about 30 microns, at least 80% of said fatty glyceride particles being in the beta crystal phase, said pourable shortening having a total solids content ranging from about 2 to about 18% by weight, a viscosity from about 200 cps to about 25,000 cps, and being pourable at ambient temperature for storage over the temperature range from about 0° F. to about 100° F., wherein said shortening measures at least 10 units more on the Whiteness Index Scale than pourable shortenings made from the same basestock using a process in which substantially all of said fatty glyceride particles are melted by heating them above their melting points.

36. A pourable shortening as in claim 35 wherein said shortening measures at least 25 units on the Whiteness Index Scale.

* * * * *